June 14, 1938. A. BROADMEYER 2,120,484
SHEET FEEDING APPARATUS
Original Filed Oct. 31, 1932 11 Sheets-Sheet 11
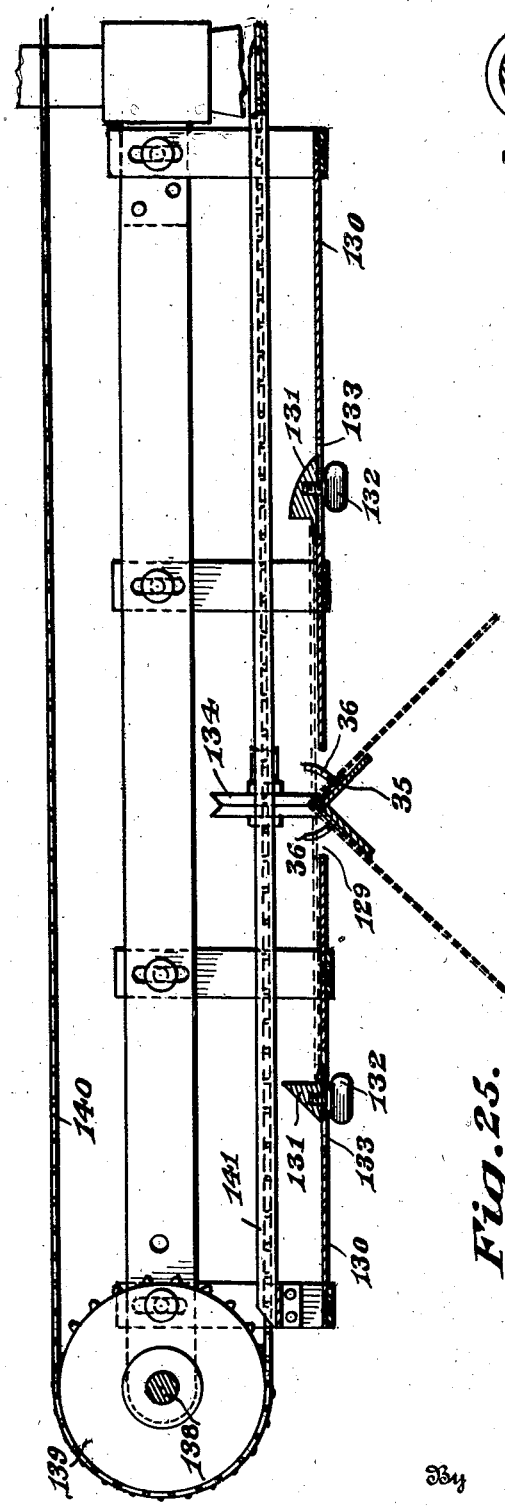
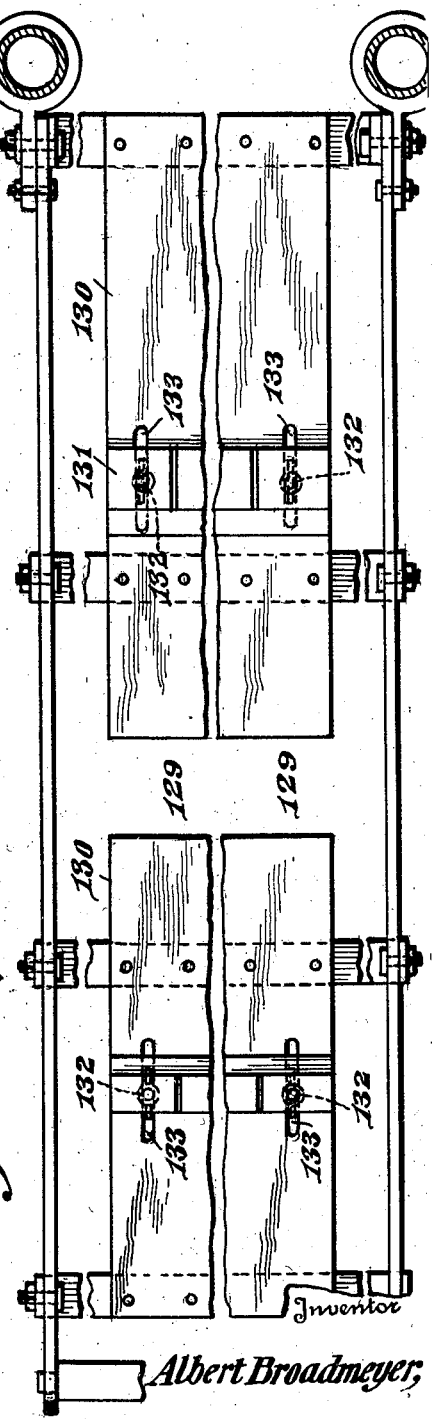
Inventor
Albert Broadmeyer,
By
Attorney Patented June 14, 1938

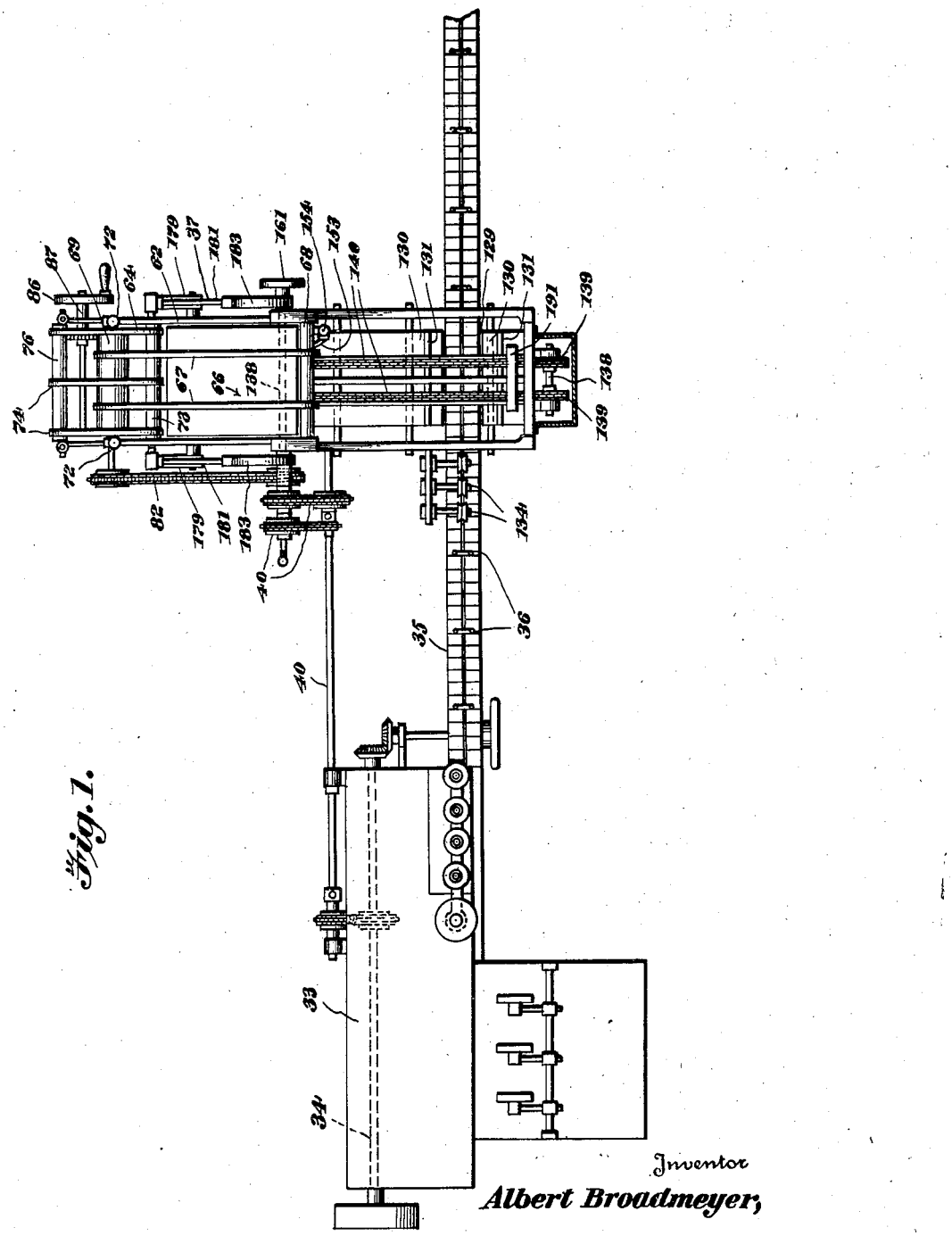

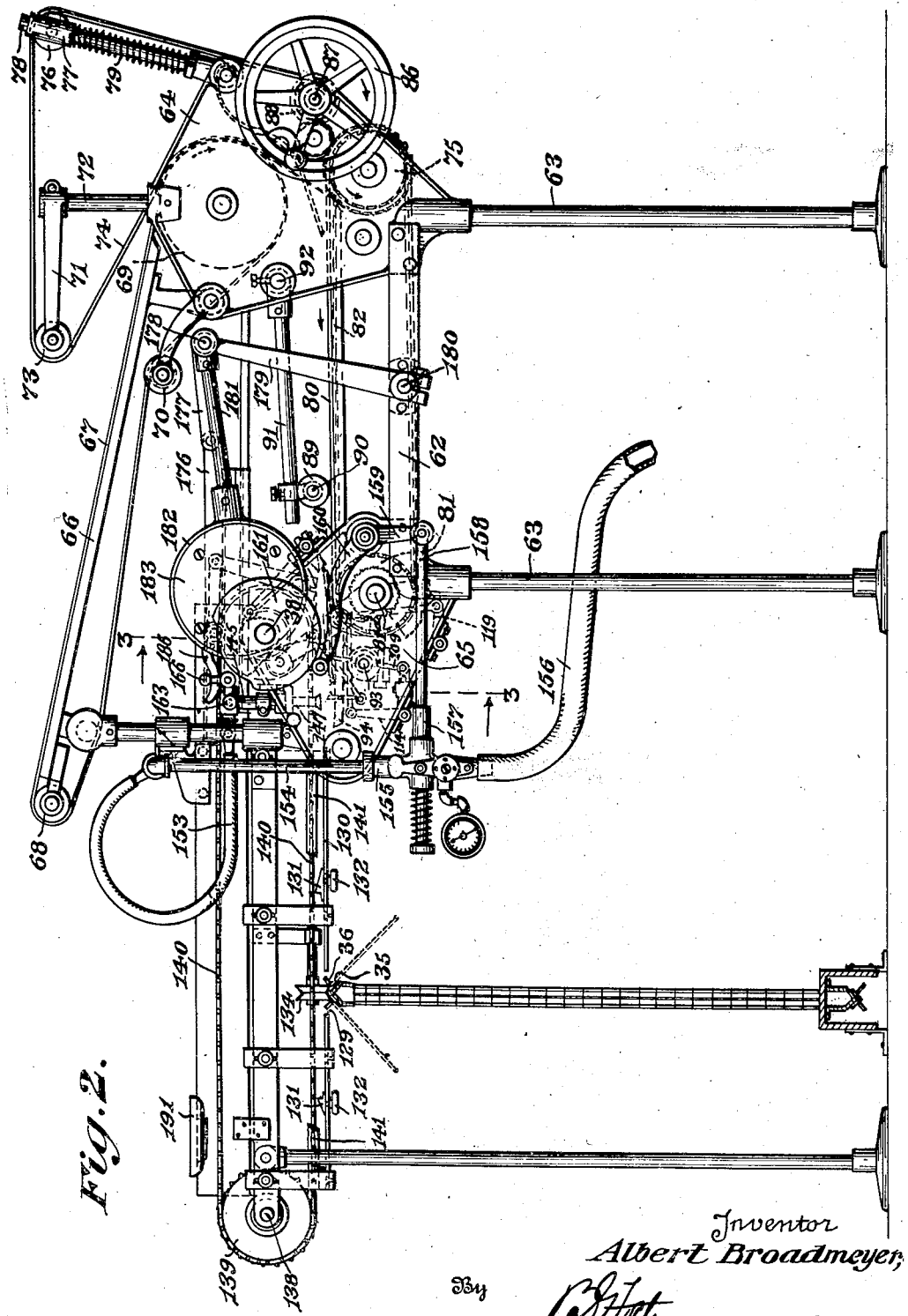

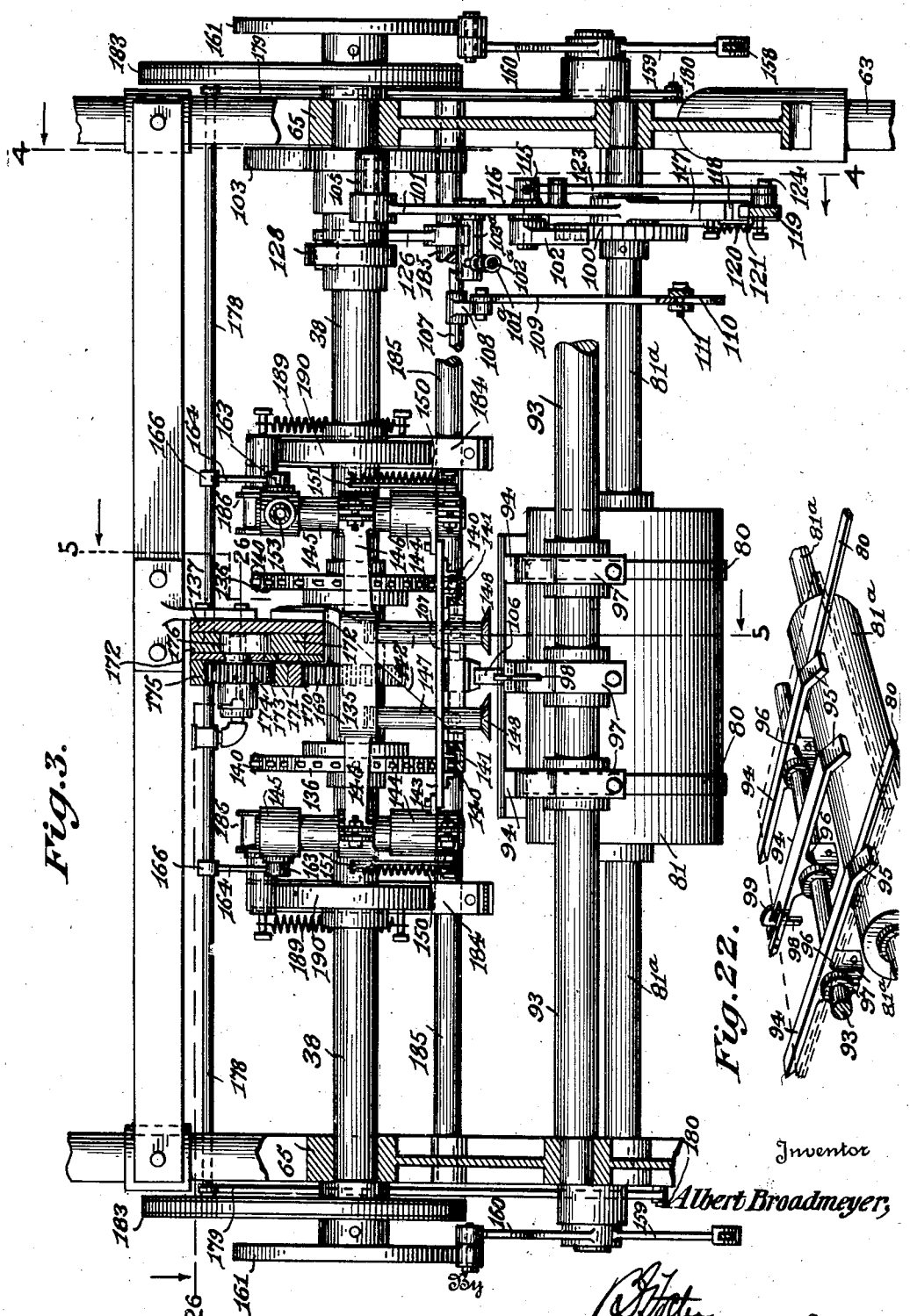

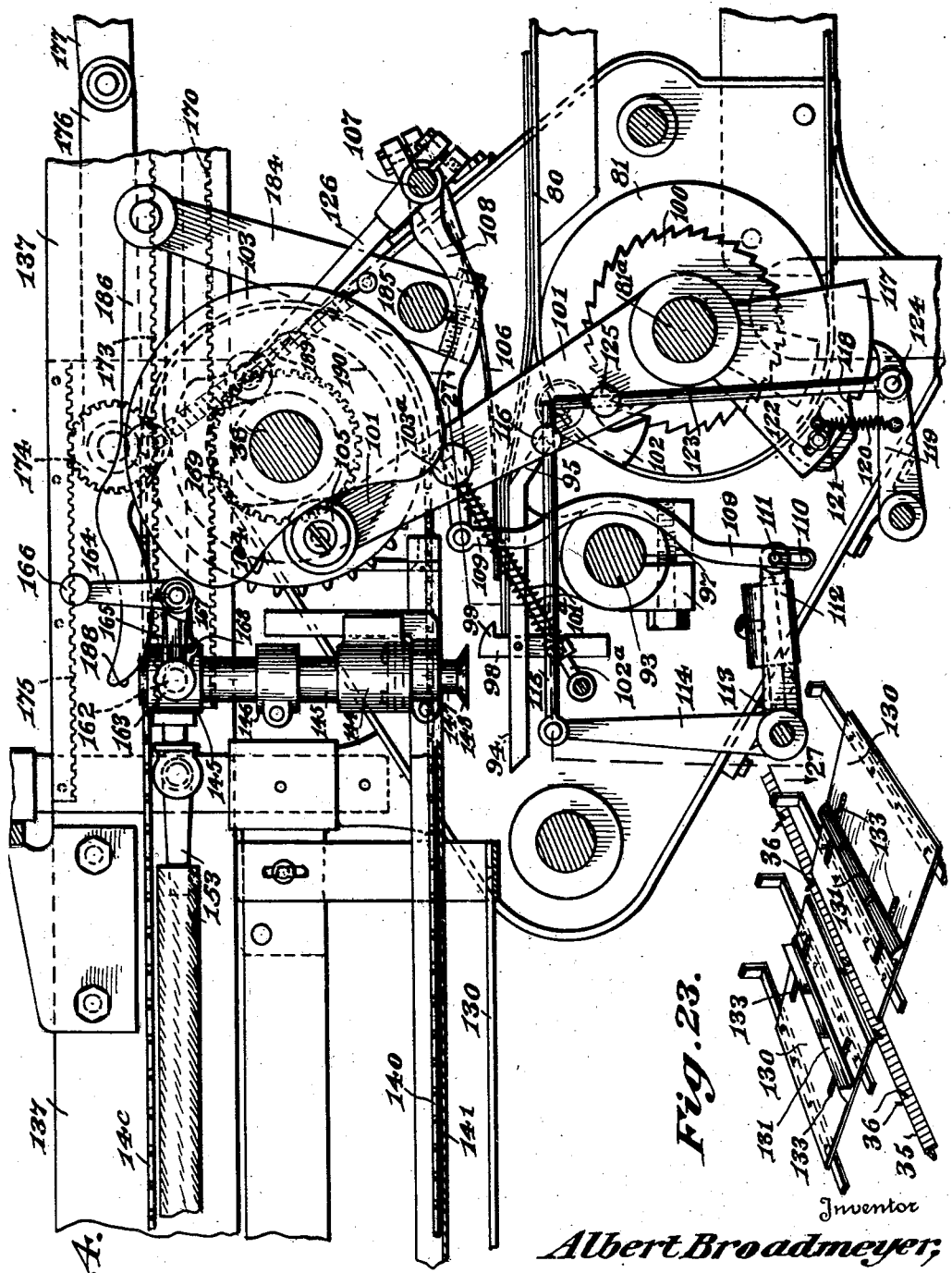

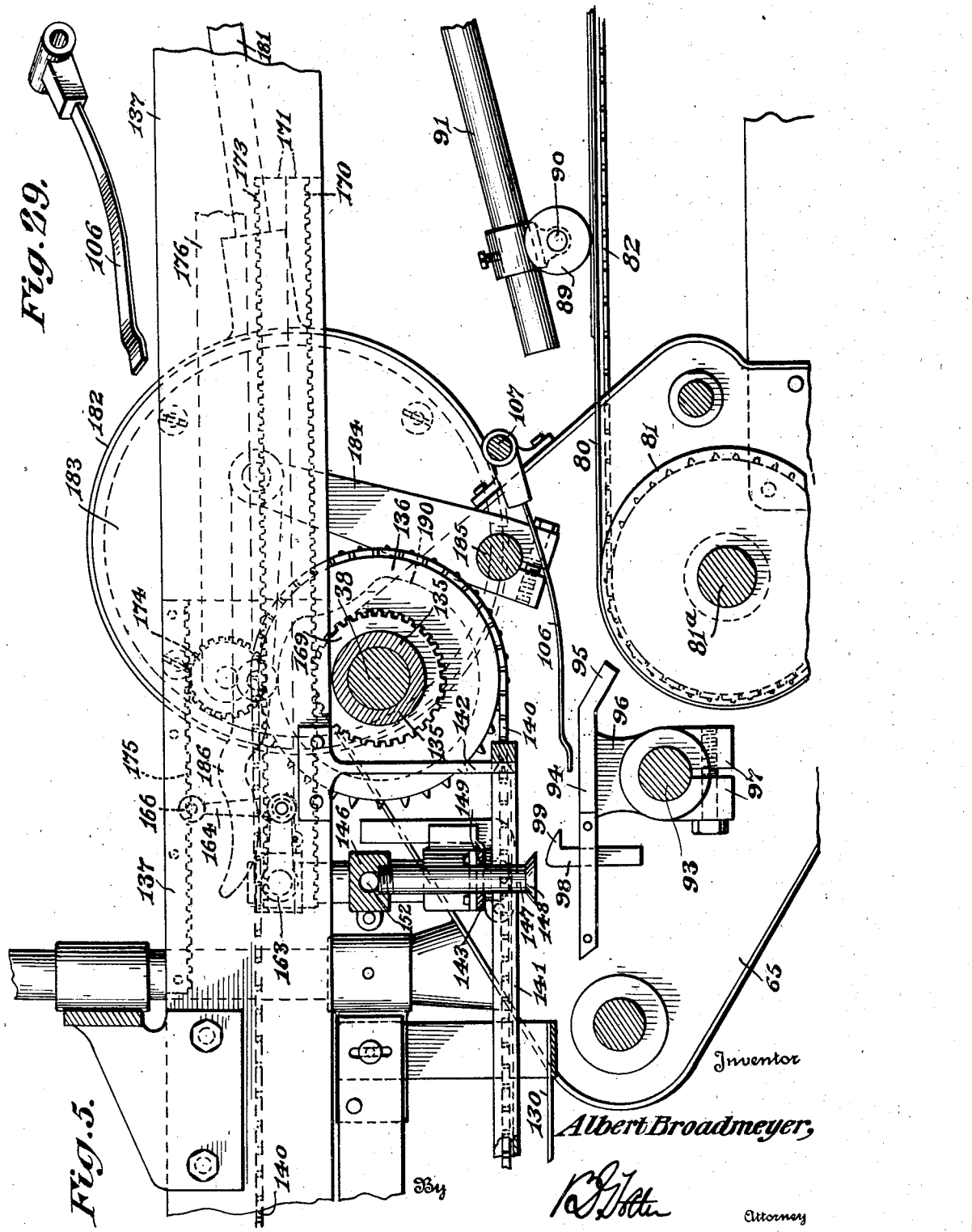

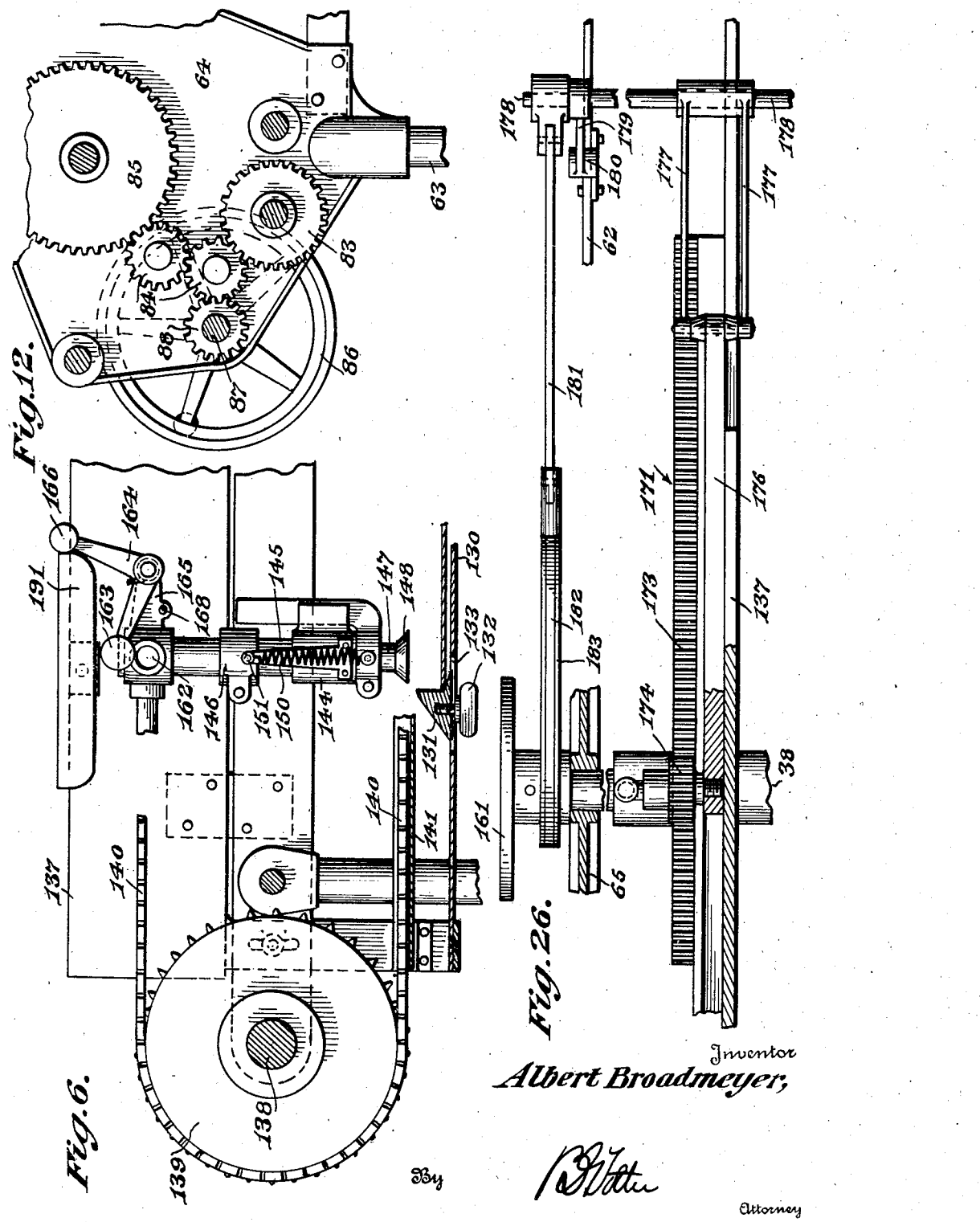

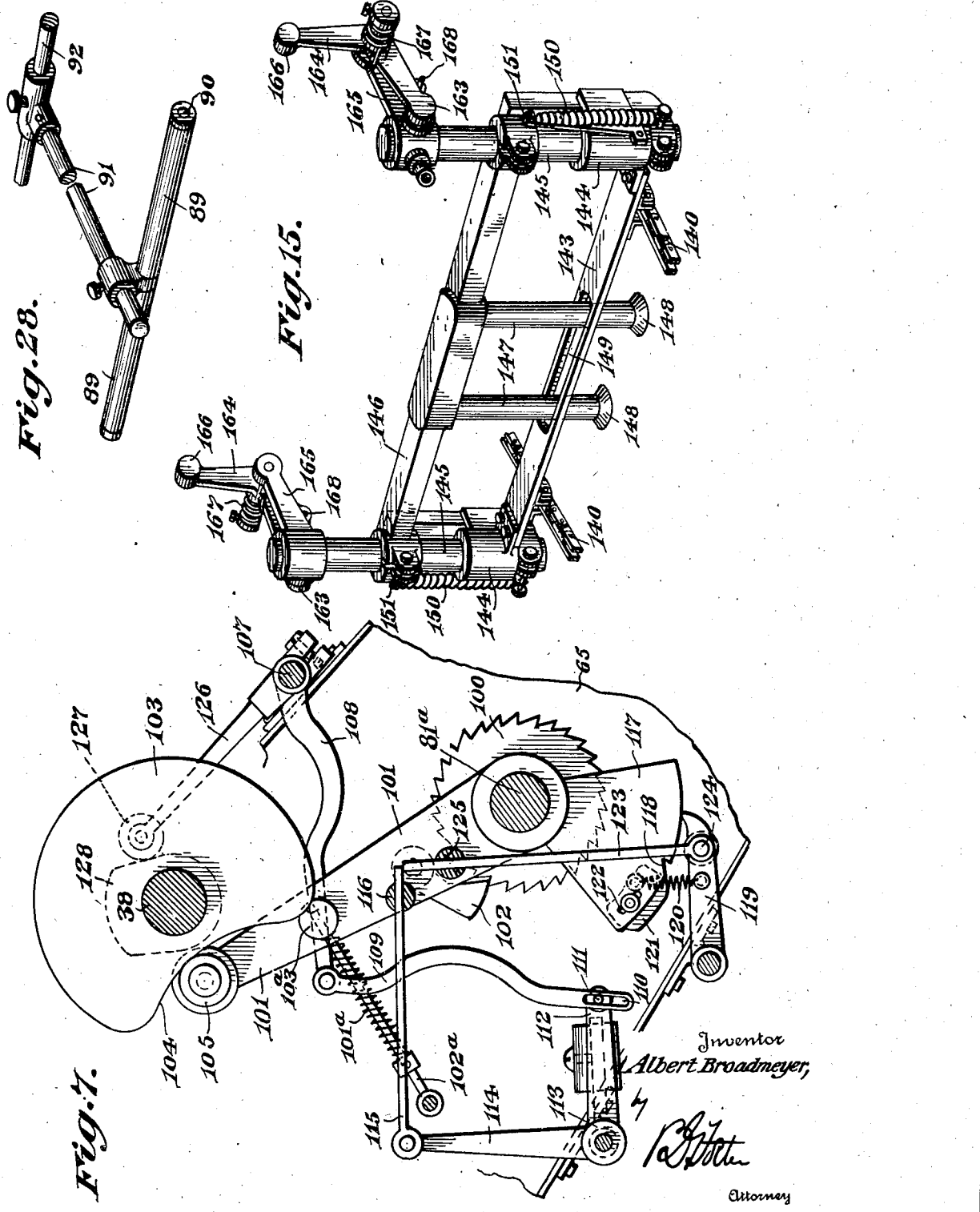

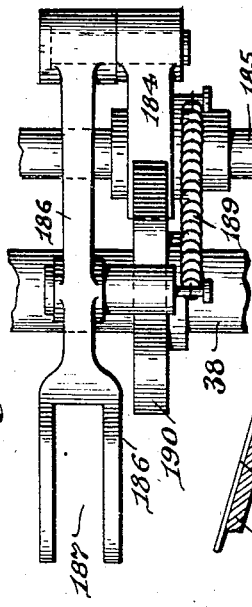
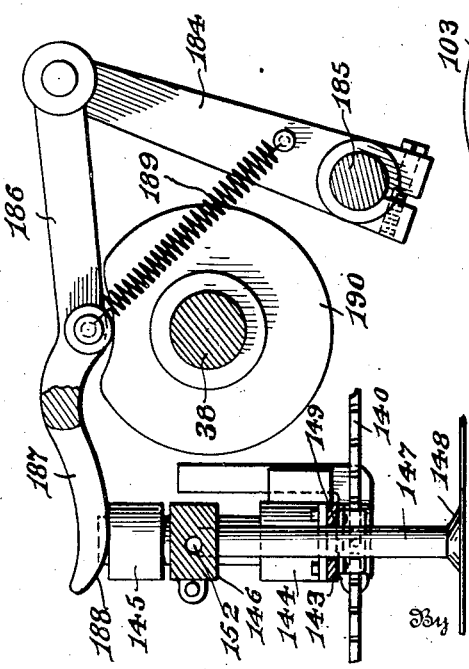
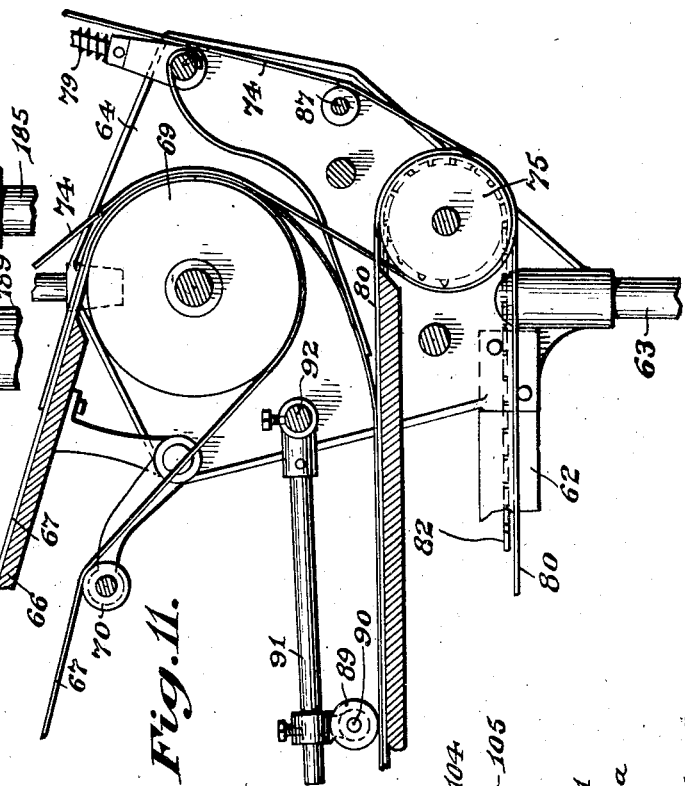
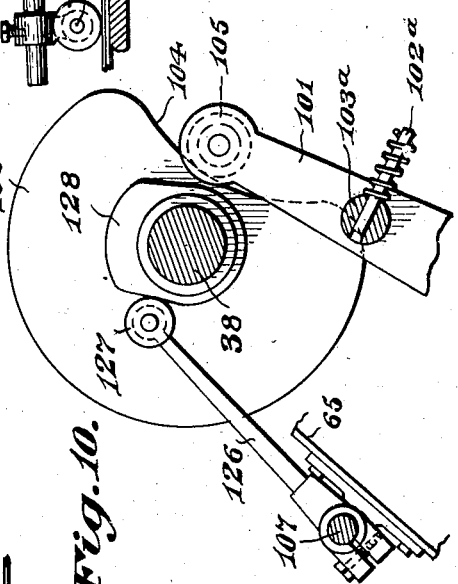

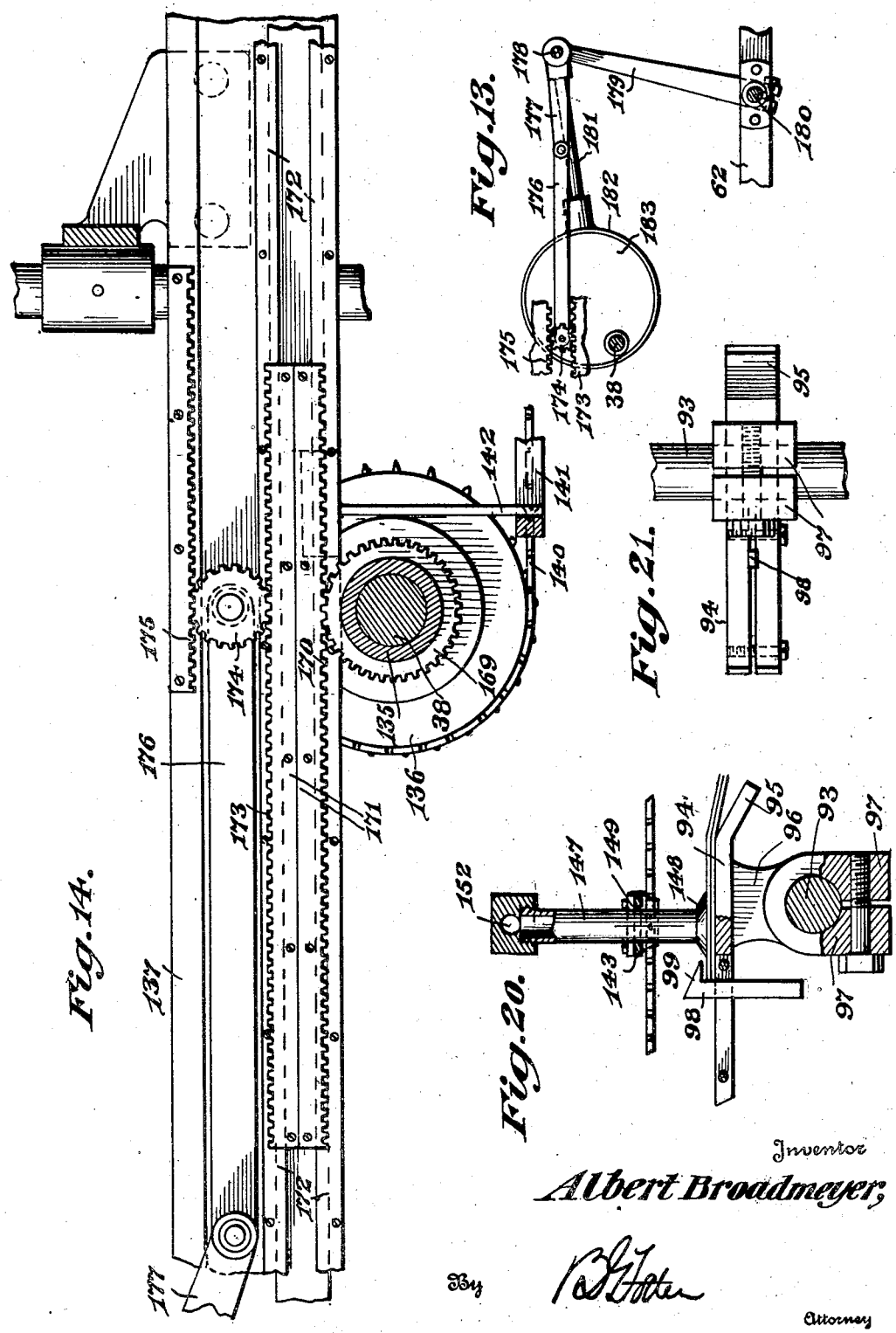

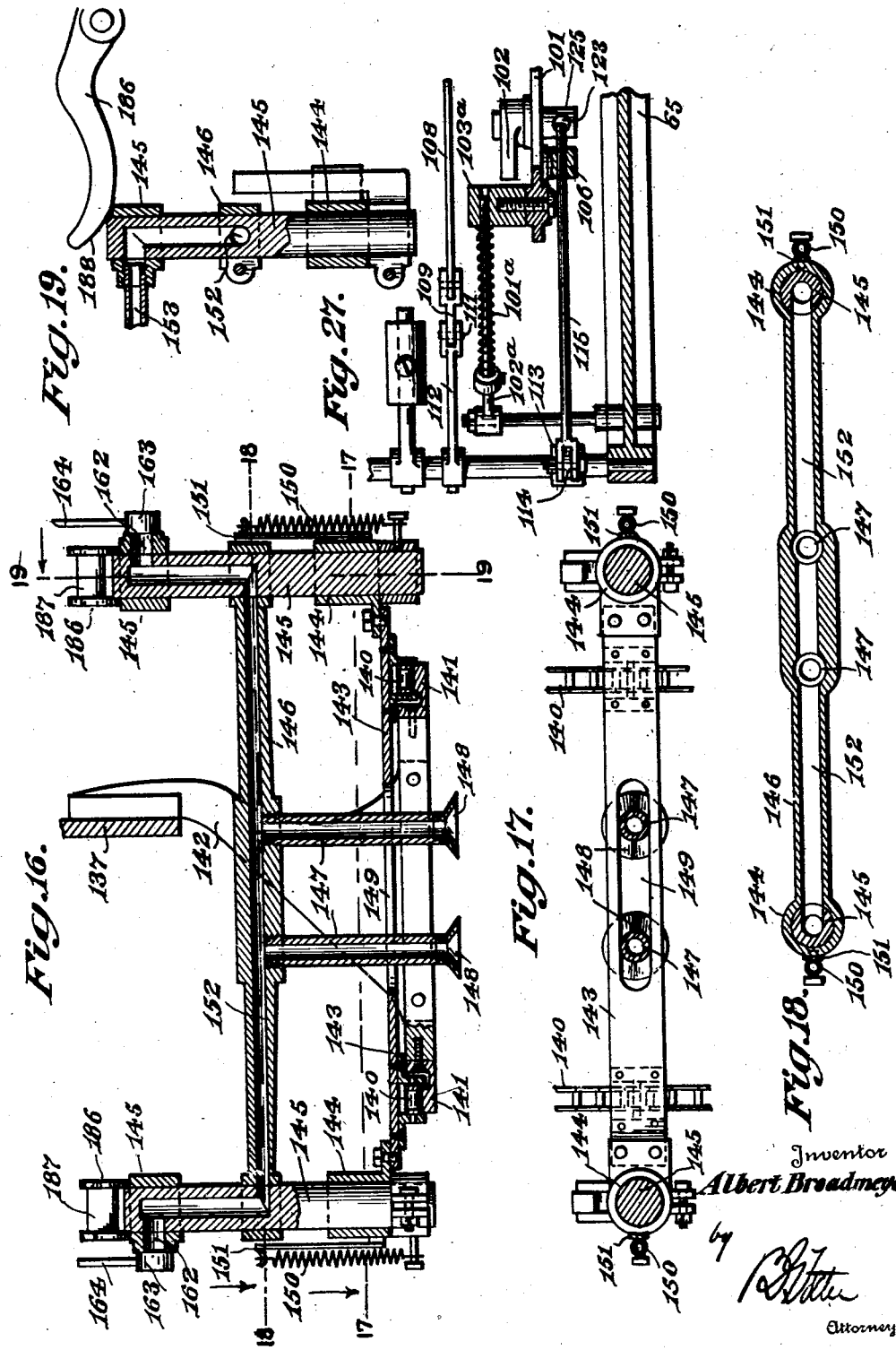

2,120,484

UNITED STATES PATENT OFFICE 2,120,484

SHEET FEEDING APPARATUS

Albert Broadmeyer, Harrisburg, Pa., assignor to W. O. Hickok Manufacturing Company, Harrisburg, Pa., a corporation of Pennsylvania Original application October 31, 1932, Serial No. 640,570. Divided and this application August 19, 1936, Serial No. 96,901

13 Claims. (Cl. 271—26)

This application is a division of application, Serial No. 640,570.

The present invention relates to sheet feeding machines, by means of which sheets of paper or the like are fed from a stock or supply and delivered singly at intervals to a mechanism which operates upon the sheets. The feeder is particularly adapted for feeding signatures to a stapling or binding mechanism, although it is useful wherever it is desirable to feed single sheets at intervals.

One object of the invention is to provide a mechanism for delivering single sheets from an assemblage or pile and deliver the same at a point remote from such assemblage or pile.

Another object is to provide novel means for maintaining a supply of sheets to be delivered by the feeding mechanism.

In the accompanying drawings:

Figure 1 is a somewhat diagrammatic plan view showing the feeder in use with a cooperating stapling machine.

Figure 2 is a side elevation of the feeder viewed in the direction of the arrow A of Figure 1.

Figure 3 is a cross sectional view on the line 3—3 of Figure 2.

Figures 4 and 5 are respectively sectional views on the lines 4—4 and 5—5 of Figure 3.

Figure 6 is a vertical longitudinal sectional view of the outer portion of the mechanism adjacent to the conveyor and is an extension of the section shown in Figure 5, but with the suction mechanism at the discharging position.

Figure 7 is a detail vertical sectional view illustrating the controlling mechanism for the sheet advancing means.

Figure 8 is a detail sectional view showing the suction head depressing means.

Figure 9 is a top plan view of the same.

Figure 10 is a detail sectional view of the cam mechanism shown in Figure 7, but reversed therefrom.

Figure 11 is a vertical sectional view of the mechanism for moving the sheets from the top to the lower table.

Figure 12 is a view of the gearing employed for operating these parts.

Figure 13 is a detail view illustrating the operating means for the prime mover pinion of the carriage operating mechanism.

Figure 14 is a detail view on an enlarged scale of the carriage moving mechanism.

Figure 15 is a perspective view of the carriage and suction head carrier.

Figure 16 is a vertical sectional view therethrough.

Figure 17 is a horizontal sectional view on the line 17—17 of Figure 16.

Figure 18 is a horizontal sectional view on the line 18—18 of Figure 16.

Figure 19 is a vertical sectional view on the line 19—19 of Figure 16.

Figure 20 is a detail view of the sheet support as illustrated in Figure 5, but with the suction head in its operative position.

Figure 21 is a bottom plan view of the structure shown in Figure 20.

Figure 22 is a detail perspective view of the sheet support.

Figure 23 is a detail perspective view of the sheet receiving table and the "saddle" or conveyor.

Figure 24 is a detail sectional view of the sheet receiving table and saddle or conveyor.

Figure 25 is a top plan view of the same.

Figure 26 is a horizontal sectional view on the line 26—26 of Figure 3.

Figure 27 is a sectional view on the line 27—27 of Figure 4.

Figure 28 is a detail perspective view of the sheet presser rollers and their mountings.

Figure 29 is a detail perspective view of the feeler finger.

Describing the drawings more particularly, Figure 1 illustrates one use of the feeder. A book-binding machine in the form of stapling mechanism is shown at 33, and such mechanism is provided with a drive shaft 34. Extending from one end of the machine is a saddle in the form of an endless conveyor 35 which is provided with spaced fingers 36, between which the sets are to be placed. The feed mechanism is designated generally 37, and here combined with the stapling mechanism, it operates to place on the saddle and between the fingers the covers that are to enclose the signatures which have been placed on the saddle prior to the passage of the fingers past the feed mechanism.

The main driving member for the feed mechanism is a drive shaft 38. The shaft 38 is driven from the drive shaft 34 of the stapling machine through driving mechanism designated generally 40, which is specifically described and claimed in application, Serial No. 640,570, of which this is a division.

Coming now to the preferred detail construction of the sheet feeding mechanism, it is shown to be of the continuous type. A frame, consisting of bars 62 mounted on suitable standards 63 with head plates 64 and 65, is employed. On this frame is an upper rearwardly declined table 66, over which operate spaced tapes 67 that pass around an upper roller 68, a rear roller 69 of relatively large diameter and underguide rollers 70. Brackets 71, carried on posts 72, provide supports for an upper roller 73, around which other tapes 74 pass, these latter tapes being out of line with the tapes 67, and passing around the rear side of the large roller 69, thence around a lower roller 75, and upwardly about a spring supported tension roller 76 whose bores 77 are slidably mounted on guide stems 78 and are supported by coiled springs 79 on said stems. Operating around the roller 75 are horizontally disposed forwardly bearing tapes 80 that pass about a front roller 81 and this roller 81 is connected with the rear rolller 75 by a sprocket chain 82 operating around sprocket wheels connected to said rollers. The roller 81 constitutes a drive roller, and thus movement is transmitted through the tapes 80 and sprocket chain 82 to the rear roller 75. As already explained this roller has the tapes 74 passing thereabout. In order that the larger roller 69 may be properly driven with the roller 75 and as shown particularly in Figure 12 there is fixed to the lower roller 75 a gear wheel 83 which transmits motion through idler gears 84 to a gear wheel 85 fixed to the roller 69. So that the sheet moving tapes may be operated manually in order to initially supply sheets in feeding position and adjust them, if the supply declines, a hand wheel 86 is mounted on a shaft 87, which is geared, as illustrated at 88, to one of the idler gears 84. There is also preferably provided a set of presser rollers 89, shown in Figures 2 and 28. These rollers are journaled on a cross spindle 90 adjustably mounted on a swinging arm 91 pivoted on a rock shaft 92. The rollers 89 bear upon the upper stretches of the tapes 80 between their ends and thus on the sheets that are carried by said tapes.

It is thought the operation of this portion of the mechanism will now be clear. The sheets fanned out on the upper tapes 67, are carried around the roller 89 and delivered on the upper forwardly moving stretches of the tapes 80 and are advanced to the front roller 81. In advance of said roller 81 and as specifically shown in Figures 5, 20, 21 and 22, is a sheet support which may be said to constitute a table and on to which the advanced ends of the sheets are delivered by the upper stretches of the tapes 80. This table is supported on a cross rod 93 and consists of horizontal plates 94 having downwardly inclined rear ends 95 and carried by brackets 96 having split collars 97 clamped on the rod 93. This permits the individual plates 94 to be moved along the collar. At least one of these plates is provided with an upstanding stop 98 having a rearwardly extending hook or beak 99 under which the front edges of the sheets engage, as indicated in Figure 20. It will be understood that the topmost sheets are successively removed from this table by the mechanism hereinafter explained. As they are removed the sheet-carrying mechanism above described is intermittently advanced. The disclosed mechanism for advancing these sheets, is the following:

The roller 81 is mounted on a shaft 81a which is provided at one end with a ratchet wheel 100 (see Figure 7). Journaled on this shaft 81a alongside the ratchet wheel is a swinging pawl carrier arm 101, and mounted on said arm is a pivoted pawl 102 that operates on the ratchet wheel when the arm 101 is swung. The main drive shaft 38 of the feeder is provided with a cam 103 having an inset portion 104, and riding the periphery of this cam is a roller 105 journaled on the end of the pawl carrier arm 101. The roller is held against the periphery of the cam by a spring 101a on a rod 102a that is slidable through a guide 103a, the spring bearing against the said guide. As the shaft 38 and cam 103 rotate, the roller will run into the inset portion 104 of the cam and the pawl 102 will ride over one or more teeth of the ratchet wheel. Then as the roller is forced out by the enlarged portion of the cam, the pawl operating against one of the teeth, will cause a partial rotation of the ratchet wheel 100, and consequently of the shaft 81a and the roller 81, the latter as heretofore explained, operating the train of mechanism that advances the sheets.

To stop this operation and prevent an oversupply of sheets when a sufficient number is in place on the table, a feeler spring finger 106 is provided that lies over the table 94 (see Figure 5), and is carried by a rock shaft 107. This rock shaft also is provided with an arm 108, to the free end of which is pivotally connected a depending link 109. The link has a longitudinal slot 110 in its lower end and in this slot is engaged a pin 111 carried by one of the arms 112 of a weighted bell crank 113. The other upstanding arm 114 of this bell crank is connected to a reciprocatory detent finger 115 whose free end is slidable in a pivoted guide 116 on the pawl carrier 101. The lower end of the pawl carrier 101 below its pivot mounting is provided with an enlargement 117, having a notch 118 adapted to be engaged by the toothed end of a pivoted dog 119. A spring 120 urges this dog into the notch, and it will be evident that when it is engaged in the notch, the arm 101 will be held from swinging rearwardly and consequently the roller 105 cannot enter the inset portion 104 of the cam. Whenever the arm 101, however, swings to carry the notch 118 beyond the dog 119, said dog will ride upon a displacing plate 121 that is adjustably mounted, as shown at 122, on the lower end of the counterweight. The dog 119 furthermore is provided with an upstanding finger 123 pivoted thereto, as shown at 124, and having its upper end slidably mounted in a guide 125 pivoted on the pawl carrier arm 101. It will be noted that the two fingers 115 and 123 have their free ends moving in intersecting paths. The rock shaft 107 furthermore has an arm 126 fixed thereto, and provided with a roller 127 that rides on a small cam 128 fixed to the drive shaft 38 alongside the cam 103. On every revolution of the shaft 38 therefore the rock shaft 107 is mechanically turned and effects an elevation of the feeler spring finger 106 and the arm 109.

The operation of the mechanism is as follows: When a sufficient number of sheets have been advanced on to the table 94 and beneath the finger 106, this finger is elevated, the arm 108 is correspondingly raised, and after a certain amount of idle movement, the lower end wall of the slot 110 will engage the pin 111, raising the arm 112 of the bell crank and pulling the finger 115 out of the path of the finger 123. Assuming then that the pawl carrier 101 is operating and the pawl 102 is turning the ratchet wheel, the notch 118 will be brought in alinement with the free end of the dog 119 and the spring 120 will carry it on into the notch, as the finger 123 can rise by reason of the non-interference of the finger 115. The operation of the pawl is there-after prevented, but there is still enough mechanical movement of the parts due to the cam 128 to cause the plate 121 to run under the free end of the dog and depress it, thereby moving the finger 123 downwardly. As the sheets are carried away from the table and the feeler finger 106 lowers, the detent finger 115 is moved to the right and will eventually move over the top of the finger 123 when it is depressed, or to the position as shown in Figure 7. When this has occurred, the extension 117 is released and the arm 101 can swing sufficiently to allow the roller 105 to enter the inset portion 104 of the cam 103. Thereupon the ratchet mechanism becomes operative to advance more sheets and this advance continues until the feeler finger 106 is again elevated by the supply.

The sheets are removed successively from the table 94 and deposited on the saddle or conveyor 35. This conveyor operates through a slot 129 of a horizontal table 130 (see Figures 23—25), the structure being such that the partially folded signatures will pass under the table and the fingers 36 will project a sufficient distance above the same to engage horizontal sheets deposited on the table across the slot 129. The sheets are positioned between stop bars 131 mounted on the table and held by set screws 132 passing through slots 133 in said tables, this mounting permitting the adjustment of the bars 131 toward and from each other. Preferably the bar 131 over which the sheets are delivered has a rounded top face as shown in Figure 24. In the rear of said table are preferably provided grooved rollers 134 that ride on the conveyor and press the sheets from their flat horizontal form to a V-shape corresponding to the cross sectional configuration of the saddle.

The mechanism for feeding the sheets from the table 94 to the table 130 is as follows: Loosely journaled on the drive shaft 38 is a sleeve 135, to which are fixed spaced sprocket wheels 136. A horizontal frame 137, extending over the table 130, carries at its outer end a shaft 138 on which are placed corresponding sprocket wheels 139. Around these sprocket wheels pass endless sprocket chains 140, the lower stretches preferably operating on supporting bars 141 hung, as shown at 142 (Figures 5 and 16) from the upper frame 137. Fixed to these lower stretches of the chains 140 is a carriage, consisting of a lower cross bar 143 having upstanding sleeves 144 at its ends (see Figures 15 and 16). Vertically slidable in said sleeves 144 are the guide members 145 of a carrier having a cross bar 146 connecting said guide members. Depending from the central portion of this cross bar 146 are two suction heads 147 (the number may obviously be varied). These heads terminate in open flared mouths 148 and said heads slidably pass through a slot 149 in the carriage bar 143. The carrier and the heads are normally held elevated by coiled springs 150 connected to the lower ends of the guide members 145 and having their upper ends mounted on standards 151 secured to the guide sleeves 144. The suction mouths 148 are in communication through the bores of the heads 147 with a suction conduit 152 extended through the cross bar 146 and the upper ends of the guide members 145. This conduit is connected at one end, and as best illustrated perhaps in Figures 1 and 4, with a flexible tube 153 that is in turn connected to a pipe 154 at one side of the machine. This pipe is connected to a valve casing 155, and from the valve casing leads a suction conduit 156 to any suitable form of vacuum-creating means, as a pump (not shown). In the valve casing 155 is a valve for controlling the suction through the conduit. This valve may be of any type, as for example, that shown in the patent granted to me March 7, 1922, No. 1,408,688, or it may be made to vent as well as close the conduit, as exemplified by the structure shown in Patent No. 1,774,315, August 26, 1930. The valve is therefore not shown in detail, but it is of the reciprocatory type, and is designated 157. It is connected to a valve stem 158 pivoted to the lower arm 159 of a lever 160, and is operated by a cam 161 on the shaft 38. In order to quickly vent the conduit 152 close to the heads 148, when the suction is cut off by the valve 157, there are provided in the guide members 145 of the carriage relief openings 162. These are normally closed by valves 163 located on the ends of bell cranks 164 that are pivotally mounted on brackets 165 carried by the guide members (see Figure 15). The upstanding arms of the bell cranks 164 have bearing heads 166, and the valves are normally moved to closed position by coiled springs 167 on the pivots of the bell cranks. The valves are stopped in their closed position by pins 168.

The carriage and consequently the suction heads are moved between a position over the table 94 and a position over the table 130 by moving the sprocket chains 140 alternately in opposite directions. This movement is accomplished by the mechanism detailed in Figure 14. The sleeve 135 carrying the sprocket wheels 136 is provided with a gear wheel 169 that is in mesh with the lower teeth 170 of a reciprocatory rack bar 171 that is slidable in a guideway 172 formed on the horizontal frame 137. This rack bar 171 has an upper set of teeth 173 in mesh with a pinion 174 that may be termed a prime mover. The pinion 174 is in mesh with a stationary rack bar 175, and the pinion is also journaled on a carrier 176 pivotally connected to a pitman 177. This pitman is connected to a cross rod 178 that connects a pair of swingings arms 179 mounted at their lower ends in a rock shaft 180 that is journaled across the frame bars 62. The cross rod is further connected by links 181 to straps 182 that encircle eccentrics 183 fixed to the opposite ends of the main drive shaft 38.

It will thus be clear that as the drive shaft 38 and the eccentrics 183 rotate, the arms 179 will be rocked, causing a reciprocation of the carrier bar 176 and reciprocating the pinion 174. As this pinion is rotated by its engagement with the stationary rack bar 175 during its reciprocation, it transmits a movement to the movable rack bar 173, which is twice that of its own movement. The rack bar in turn, operating on the gear wheel 169, rotates this, and by reason of the larger sprocket wheels 136, the chains are given a greatly increased movement over the reciprocatory movement given to the pinion 174, and this movement of the sprocket chains is sufficient to carry the suction heads 147 from a position over the supporting table 94 to a position over the receiving table 130 and back again.

When the suction heads 147 are over the table 94, and before or approximately at the time suction is created in said heads, they are depressed on to the topmost sheet of paper on said table. To effect this operation the mechanism illustrated in detail in Figures 8 and 9 is employed. Upstanding brackets 184 are provided on one of the cross rods 185 and pivoted to the upper ends of these brackets 184 are arms 186 whose free ends are bifurcated as shown at 187 and have rounded undersurfaces 188. These bifurcated ends rest upon the tops of the guide members 145 which carry the heads. When said heads are over the table 94, the guide members are pulled downwardly by springs 189 connecting the brackets 184 and the arms 186. Their downward movements are controlled by cams 190 on the drive shaft 38.

When the suction heads are at their delivery position over the table 130, means are provided for opening the vents 162 by the operation of the valves 163. This is accomplished as best shown in Figure 6 by abutments 191 located on the frame 137 and adapted to be engaged by the heads 166 of the bell cranks 164.

Assuming the drive shaft 38 to be timed properly to the conveyor and binding apparatus, the operation of the feeding mechanism is as follows: As the shaft 38 rotates, the suction heads 147 are brought over the table 94 and under the bifurcated ends 187 of the arms 186. At this moment the cams 190 are turned to the position shown in Figure 8, allowing the springs 189 to operate on the arms and depress the suction heads. At approximately the same time the cam 161 comes to a position to open the controlling valve 157 in the suction line and a partial vacuum is created at the mouths 148 of the heads 147, so that the uppermost sheet on the table becomes attached thereto. The arms 186 are now raised by the cams 190 and the springs 150 therefore raise the carrier and suction heads 147 with the sheet attached. At this point the pinion 174 starts on its rearward travel due to the operation and positions of the eccentrics 183, so that the sprocket wheels 136 are revolved in a direction to move the lower stretches of the chains rearwardly, carrying the suction heads and the attached sheet with them until the sheet is brought over the receiving table 130 and between the stop bars 131. As the suction heads advance in this direction the valve 157 is closed to cut off the suction and the heads 166 of the bell cranks 164 strike the abutment 191, causing the bell cranks to turn and the valves 163 to be removed from the vent ports 162. The vacuum is therefore immediately destroyed, the sheet becomes detached and will position itself between the stop bars 131 and between two sets of fingers 36 of the conveyor 35, carrying the underlying signatures. The conveyor moves on and the rear set of the two will of course move the sheet that has been deposited along with them under the rollers 134, where it is bent downwardly to correspond to the signatures already deposited. The conveyor then carries the assemblage to the stapling mechanism which is timed with the others, to effect a proper operation in securing together the signatures. As soon as a sheet has been deposited, the eccentrics 183 reversing their positions, cause the pinion 174 to return the carriage, allowing the vent valves to close and bringing the suction heads again over the table 94 for a repetition of the above described operation.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In combination with a support for sheets, of a horizontally movable carriage, a suction head movable with the carriage and movable downwardly thereon, means for moving the head on the carriage to engage a sheet on the support, means for creating suction in the head when moved downwardly to engage a sheet, means for relieving said suction including a relief vent and a closure for the vent that travels with the carriage, and stationary means for engaging and operating the closure to open the vent when the carriage and suction head is at a point to discharge the sheet.

2. In combination with a support for sheets, of a carriage horizontally movable between the support and a delivery point, a suction head mounted on the carriage and movable thereon to engage a sheet on the support, a suction producing conduit in communication with the head, a controlling valve in the conduit, mechanism for separately operating the carriage and the valve in timed relation to create suction in the conduit and head when the carriage has positioned the head at the sheet support and to cut off the suction when the carriage has positioned the head at a desired delivery point, said conduit having a portion on the carriage provided with a suction relief vent opening, a valve on the carriage controlling the vent opening, and an abutment operating the valve to open the vent opening when the first controlling valve is operated to cut off the suction.

3. In combination with a support for sheets, of a track, a reciprocatory carriage mounted on the track and movable to and from a position over the sheet support, a depressible carrier mounted on the carriage, a suction head on the carrier, a carrier depressing arm above the carrier when the latter is adjacent the sheet support, a suction conduit communicating with the head, a controlling valve in the conduit, a drive shaft, means operated by the drive shaft for reciprocating the carriage, means operated by the drive shaft for depressing the arm and thereby the carrier and head when the latter is above the sheet support, and means for operating the valve to open the suction conduit when the head is depressed.

4. In combination with a sheet support, of a carriage movable toward and from the same, a sheet carrying device movable with the carriage to carry sheets from the support, a prime mover for the carriage including a rotatable pinion having a limited back and forth movement, fixed and movable racks engaged by the pinion, and means for operating the carriage by the movable rack.

5. In combination with a sheet support, of a carriage movable toward and from the same, a sheet carrying device movable with the carriage to carry sheets from the support, a prime mover for the carriage including a rotatable pinion having a limited back and forth movement, fixed and movable racks engaged by the pinion, a gear actuated by the movable rack, and means operated by the gear for causing a back and forth movement of the carriage.

6. In combination with a sheet support, of a reciprocatory carriage movable toward and from the sheet support, a sheet carrying device on the carriage, a track frame, a rack fixed to the frame, a reciprocatory rack on the frame, a pinion engaged with the racks, means for reciprocating the pinion, a gear engaged with the reciprocatory rack, a sprocket wheel rotated by the gear, and a sprocket chain operated by the sprocket wheel and connected to the carriage.

7. In combination with a sheet support, of a carriage movable toward and from the same, a sheet carrying device movable with the carriage to carry sheets from the support, a prime mover for the carriage having a limited back and forth movement, gearing between the prime mover and carriage for effecting a greater movement of the latter than that given to the former and including a rotatable gear having a bodily back and forth movement, a drive member for operating the prime mover, and mechanism operated by the drive member in timed relation with the prime mover for actuating the sheet carrying device to attach a sheet thereto when it is adjacent the sheet support and to detach the sheet when removed from said support.

8. In combination with a sheet support, of a reciprocatory carriage movable toward and from the sheet support, a sheet carrying suction head on the carriage, intermittently operable suction control means for the suction head, a track frame, a rack fixed to the frame, a reciprocatory rack on the frame, a pinion engaged with the racks, means for reciprocating the pinion, a gear engaged with the reciprocatory rack, a sprocket wheel rotated by the gear, a sprocket chain operated by the sprocket wheel and connected to the carriage, a drive shaft, means operated by the drive shaft for reciprocating the pinion, and means operated by the drive shaft for moving the suction control means in timed relation to the reciprocation of the pinion.

9. In sheet feeding apparatus, the combination with a supporting frame, of a drive shaft journaled thereon, a sheet support, sprocket wheels journaled on the shaft, chains operating around the wheels, a reciprocatory carriage mounted on the chains, a sheet carrier mounted on the carriage, and means operated by the shaft for moving the sprocket wheels alternately in opposite directions to reciprocate the carriage.

10. In sheet feeding apparatus, the combination with a supporting frame, of a drive shaft journaled thereon, a sheet support, a conveyor operating transversely of the frame at one side of the sheet support, sprocket wheels journaled on the shaft, chains operating around the wheels and extending over the conveyor, a reciprocatory carriage mounted on the chains, a depressible carrier mounted on the carriage, a suction head carrier mounted on the carrier, an arm engaging the carrier when the head is over the sheet support, a cam on the drive shaft operating on the arm to depress it and the carrier when the head is positioned over the sheet support, a suction conduit in communication with the head, a controlling valve for the conduit, means operated by the shaft for moving the valve to open the conduit when the head is depressed, and means operated by the shaft for moving the sprocket wheels and chains back and forth to carry the carriage between the sheet support and the conveyor.

11. In combination with a support for sheets, a horizontally movable carriage, means for moving the carriage toward and from the sheet support, a sheet carrier suction head mounted on the carriage and movable therewith, the sheet carrier being depressible with respect to the carriage, means for creating and destroying suction in the head, and means located adjacent the sheet support and detachably engaged by the head only when the carriage is at the sheet support, the said means operating when the carriage is at the sheet support, to depress the head to engage a sheet on the support.

12. In combination with a support for sheets, a horizontally movable carriage, means for moving the carriage toward and from the sheet support, a sheet carrier suction head mounted on the carriage and movable therewith, the said head being depressible with respect to the carriage and normally held in raised position, means for creating and destroying suction in the head, an overlying swinging arm mounted upon a stationary pivot and located at a point adjacent the sheet support, said arm engaging the head as the latter approaches the sheet support and means for operating the arm when the head is engaged therewith and the carriage is at the sheet support, to depress the head to engage a sheet on the support.

13. In combination with a support for sheets, a carriage movable in a horizontal direction only, means for moving the carriage toward and from the sheet support, a vertically reciprocable, normally raised carrier on the carriage, a sheet carrying device on the carrier, an overlying swinging arm mounted upon a stationary pivot and located adjacent the sheet support, the said arm engaging the carrier as the carriage approaches the sheet support, and a cam operating the arm when engaged with the carrier to depress the carrier and sheet carrying device to engage the latter with a sheet on the support.

ALBERT BROADMEYER.